United States Patent [19]
Steenburgh et al.

[11] Patent Number: 6,134,699
[45] Date of Patent: Oct. 17, 2000

[54] METHOD AND APPARATUS FOR DETECTING VIRTUAL ADDRESS PARITY ERROR FOR A TRANSLATION LOOKASIDE BUFFER

[75] Inventors: James Anthony Steenburgh; Sandra S. Woodward, both of Rochester, Minn.

[73] Assignee: International Business Machines Corporation, Armonk, N.Y.

[21] Appl. No.: 09/016,244

[22] Filed: Jan. 30, 1998

[51] Int. Cl.[7] .................................................. G06F 11/00
[52] U.S. Cl. ............................. 714/803; 714/53; 714/758
[58] Field of Search .................................... 714/7, 53, 768, 714/763, 764, 765, 758, 766, 800, 803, 819; 711/203, 204, 205

[56] References Cited

U.S. PATENT DOCUMENTS

| | | | |
|---|---|---|---|
| 4,271,521 | 6/1981 | Mahmood . | |
| 4,638,426 | 1/1987 | Chang et al. | 364/200 |
| 4,799,222 | 1/1989 | Barlow et al. | 371/51 |
| 4,920,477 | 4/1990 | Colwell et al. | 364/200 |
| 5,241,547 | 8/1993 | Kim . | |
| 5,265,227 | 11/1993 | Kohn et al. | 395/400 |
| 5,321,706 | 6/1994 | Holm et al. . | |
| 5,345,582 | 9/1994 | Tsuchiya . | |
| 5,375,214 | 12/1994 | Mirza et al. | 395/400 |
| 5,392,410 | 2/1995 | Liu | 395/400 |
| 5,455,834 | 10/1995 | Chang et al. | 714/768 |
| 5,530,823 | 6/1996 | Tsuchiya et al. | 395/417 |
| 5,564,111 | 10/1996 | Glew et al. | 395/185.06 |
| 5,606,683 | 2/1997 | Riordan . | |
| 5,790,774 | 8/1998 | Sarkozy | 395/182.04 |
| 5,909,694 | 6/1999 | Gregor et al. | 711/128 |
| 5,930,832 | 7/1999 | Heaslip et al. | 711/207 |
| 5,940,873 | 8/1999 | Mou | 711/208 |
| 5,987,585 | 11/1999 | Motoyama et al. | 712/1 |

FOREIGN PATENT DOCUMENTS 8147779 of 0000 Japan .

OTHER PUBLICATIONS

U.S. application No. 08/958,716, filed Oct. 23, 1997, entitled Method and Apparatus for Selecting Thread Switch Events in a Multithreaded Processor, by J.M. Borkenhagen et al.

U.S. application No. 08/956,875, filed Oct. 23, 1997, entitled an Apparatus and Method to Guarantee Forward Progress in a Multithreaded Processor, by J.M. Borkenhagen et al.

U.S. application No. 08/958,718, filed Oct. 23, 1997, entitled Altering Thread Priorities in a Multithreaded Processor, by J.M. Borkenhagen et al.

(List continued on next page.)

*Primary Examiner*—Ayaz R. Sheikh
*Assistant Examiner*—William L. Davis, II
*Attorney, Agent, or Firm*—Joan Pennington

[57] ABSTRACT

A method and apparatus are provided for detecting virtual address parity error for a translation lookaside buffer in a computer system. The computer system includes a processor unit, a cache coupled to the processor unit, a main memory, and a storage control unit including a translation lookaside buffer (TLB) and a segment lookaside buffer (SLB). A virtual address parity (VAP) is generated for each entry written in the segment lookaside buffer (SLB). A virtual address parity (VAP) is generated for each virtual address entry written in the translation lookaside buffer (TLB). The SLB virtual address parity (VAP) and the TLB virtual address parity (VAP) are utilized for identifying a translation miss condition.

12 Claims, 7 Drawing Sheets

U.S. PATENT DOCUMENTS

U.S. application No. 08/956,577, filed Oct. 23, 1997, entitled Method and Apparatus to Force a Thread Switch in a Multithreaded Processor, by J.M. Borkenhagen et al.

U.S. application No. 08/773,572, filed Dec. 27, 1996, entitled Background Completion of Instruction and Associated Fetch Request in a Multithreaded Processor, by J.M. Borkenhagen et al.

U.S. application No. 08/761,378, filed Dec. 9, 1996, entitled Multi–Entry Fully Associative Transition Cache, by D.L. Freerksen et al.

U.S. application No. 08/761,380, filed Dec. 9, 1996, entitled Method and Apparatus for Prioritizing and Routing Commands from a Command Source to a Command Sink, by D.L. Freerksen et al.

U.S. application No. 08/761,379, filed Dec. 9, 1996, entitled Method and Apparatus for Tracking Processing of a Command, by D.L. Freerksen et al.

U.S. application No. 08/473,692, filed Jun. 7, 1995, entitled Method and System for High Performance Multithread Operation in a Data Processing System, by R.J. Eickemeyer et al.

U.S. application No. 08/675,315, filed Jul. 3, 1996, entitled Multi–Threaded Cell for a Memory, by A.G. Aipperspach et al.

U.S. application No. 08/957,002, filed Oct. 23, 1997, entitled Thread Switch Control in a Multithreaded Processor System, by J.M. Borkenhagen et al.

TAGS ACTIVE MODE ADDRESSING

| | X0 | X4 | X8 | X12 | 0 | 4 | 8 | 12 | 16 | 20 | 24 | 32 | 36 | 40 | 44 | 48 | 52 | 56 | 60 |
|---|---|---|---|---|---|---|---|---|---|---|---|---|---|---|---|---|---|---|---|
| EA | | | | | EA (0:35) | | | | | | | | EA (36:63) | | | | | | |
| VA | ZEROS | | | | VA=EA (0:35) | | | | | | | | VA=EA (36:63) | | | | | | |
| RA | | | | | | | | | | | | | RA (24:51) FROM TLB (FROM PTE) | | | | RA=EA (52:63) | | |
| RA E=R, E=DS, RELOCATE OFF | | | | | | | | | | | | | RA (24:51) | | | | RA=EA (52:63) | | |

FIGURE 4A

TAGS INACTIVE MODE ADDRESSING

| | X0 | X4 | X8 | X12 | 0 | 4 | 8 | 12 | 16 | 20 | 24 | 32 | 36 | 40 | 44 | 48 | 52 | 56 | 60 |
|---|---|---|---|---|---|---|---|---|---|---|---|---|---|---|---|---|---|---|---|
| EA | -------------------- | | | | EA (0:35) | | | | | | | | EA (36:63) | | | | | | |
| VA | VA=EA (0:35) FROM SLB (FROM STE) | | | | | | | | | | | | VA=EA (36:63) | | | | | | |
| RA (BAT HIT) | -------------------------------------------------- | | | | | | | | | | RA (24:46) FROM BAT | | | | | | RA=EA (47:63) | | |
| RA (NO BAT HIT) | -------------------------------------------------- | | | | | | | | | | RA (24:51) FROM TLB (FROM PTE) | | | | | | RA=EA (52:63) | | |
| RA E=R, E=DS, RELOCATE OFF | -------------------------------------------------- | | | | | | | | | | RA=EA (24:51) | | | | | | RA=EA (52:63) | | |

FIGURE 4B

SEGMENT LOOKASIDE BUFFER 304

| | VA (0-51) 502 | VAP 504 | |
|---|---|---|---|
| | * * * | * * * | |
| | * * * | * * * | |
| | * * * | * * * | |

500

TRANSLATION LOOKASIDE BUFFER 306

| | VA (0-60) 508 | VAP 510 | |
|---|---|---|---|
| | * * * | * * * | |
| | * * * | * * * | |
| | * * * | * * * | |

506

METHOD AND APPARATUS FOR DETECTING VIRTUAL ADDRESS PARITY ERROR FOR A TRANSLATION LOOKASIDE BUFFER

RELATED APPLICATION

The present invention relates to U.S. patent application Ser. No. 08/957,002 filed Oct. 23, 1997, entitled THREAD SWITCH CONTROL IN A MULTITHREADED PROCESSOR SYSTEM and assigned to the present assignee. The subject matter of the above identified patent application is incorporated herein by reference.

FIELD OF THE INVENTION

The present invention relates to the data processing field, and more particularly, relates to a method and apparatus for detecting virtual address parity error for a translation lookaside buffer in a computer system.

DESCRIPTION OF THE RELATED ART

In order to reduce data access time, special purpose high-speed memory spaces of static random access memory (RAM) called a cache are used to temporarily store data which are currently in use. For example, the cached data can include a copy of instructions and/or data obtained from main storage for quick access by a processor. A processor cache typically is positioned near or integral with the processor. Data stored in the cache advantageously may be accessed by the processor in only one processor cycle retrieving the data necessary to continue processing; rather than having to stall and wait for the retrieval of data from a secondary memory, such as a higher level cache memory or main memory.

Another cache example is the buffer memory included an input/output (I/O) bridge chip. An I/O bridge chip provides the connection between two different data buses in a computer system. Also an I/O bridge chip can be part of an input/output processor (IOP). An I/O bridge chip typically contains a cache, registers, and the components necessary to connect two different buses together. Data flows to and from devices connected to one of the buses, through the bridge chip and its cache and to and from another bus, which might be connected to a different device or host computer. An example of such a configuration is a host computer with a host bus connected to a bridge chip, which is further connected to another bus that attaches multiple I/O processors.

When the processor requests a data item or word from memory, the cache is accessed when the processor processes a memory access instruction. If the desired word, for example, data or program instruction, resides in the cache, this is called a cache hit and the desired word is read from the cache. If the desired data or program instruction is not found in the cache, this is a called cache miss. With a cache miss, secondary memory is accessed to read that word, and a block of words containing that word is transferred from the main memory to the cache and the processor. A cache miss causes the processor to wait or creates a stall, degrading system performance.

Various techniques are known for mapping blocks of main memory into the cache. Known methods of mapping main memory and cache addressing include a direct mapping cache configuration, a set-associative cache configuration, and a fully associative cache configuration. The physical locations that make up the cache are called cache blocks or lines. Each cache block has a tag or a set of address tags associated with it.

A program references storage using an effective address computed by the processor when it executes a load, store, branch, or cache instruction, and when it fetches the next sequential instruction. The effective address is translated to a real address according to predefined translation procedures. To minimize address translation time, a specialized cache dedicated to address translation called a translation lookaside buffer (TLB) typically is used for address translations.

Parity protection is needed on all of the data in the translation lookaside buffer (TLB); however, the available cycle time does not permit conventional parity checking techniques for parity checking on the virtual address in the TLB array.

A need exists for an improved method and apparatus for detecting virtual address parity error for a translation lookaside buffer. It is desirable to provide such improved method and apparatus for detecting virtual address parity error that is simple to implement and that optimizes computer system performance.

SUMMARY OF THE INVENTION

A principal object of the present invention is to provide a method and apparatus for detecting virtual address parity error for a translation lookaside buffer in a computer system. Other important objects of the present invention are to provide such method and apparatus for detecting virtual address parity error for a translation lookaside buffer in a computer system substantially without negative effect and that overcome many of the disadvantages of prior art arrangements.

In brief, a method and apparatus are provided for detecting virtual address parity error for a translation lookaside buffer in a computer system. The computer system includes a processor unit, a cache coupled to the processor unit, a main memory, and a storage control unit including a translation lookaside buffer (TLB) and a segment lookaside buffer (SLB). A virtual address parity (VAP) is generated for each entry written in a segment lookaside buffer (SLB). A virtual address parity (VAP) is generated for each virtual address entry written in the translation lookaside buffer (TLB). The SLB virtual address parity (VAP) and the TLB virtual address parity (VAP) are utilized for identifying a translation miss condition.

BRIEF DESCRIPTION OF THE DRAWINGS

The present invention together with the above and other objects and advantages may best be understood from the following detailed description of the preferred embodiments of the invention illustrated in the drawings, wherein:

FIGS. 4A and 4B are addressing tables for the effective address translation logic of FIG. 3 respectively illustrating tags active mode addressing and tags inactive mode addressing in accordance with the preferred embodiment;

DETAILED DESCRIPTION OF THE PREFERRED EMBODIMENTS

Figure 1:
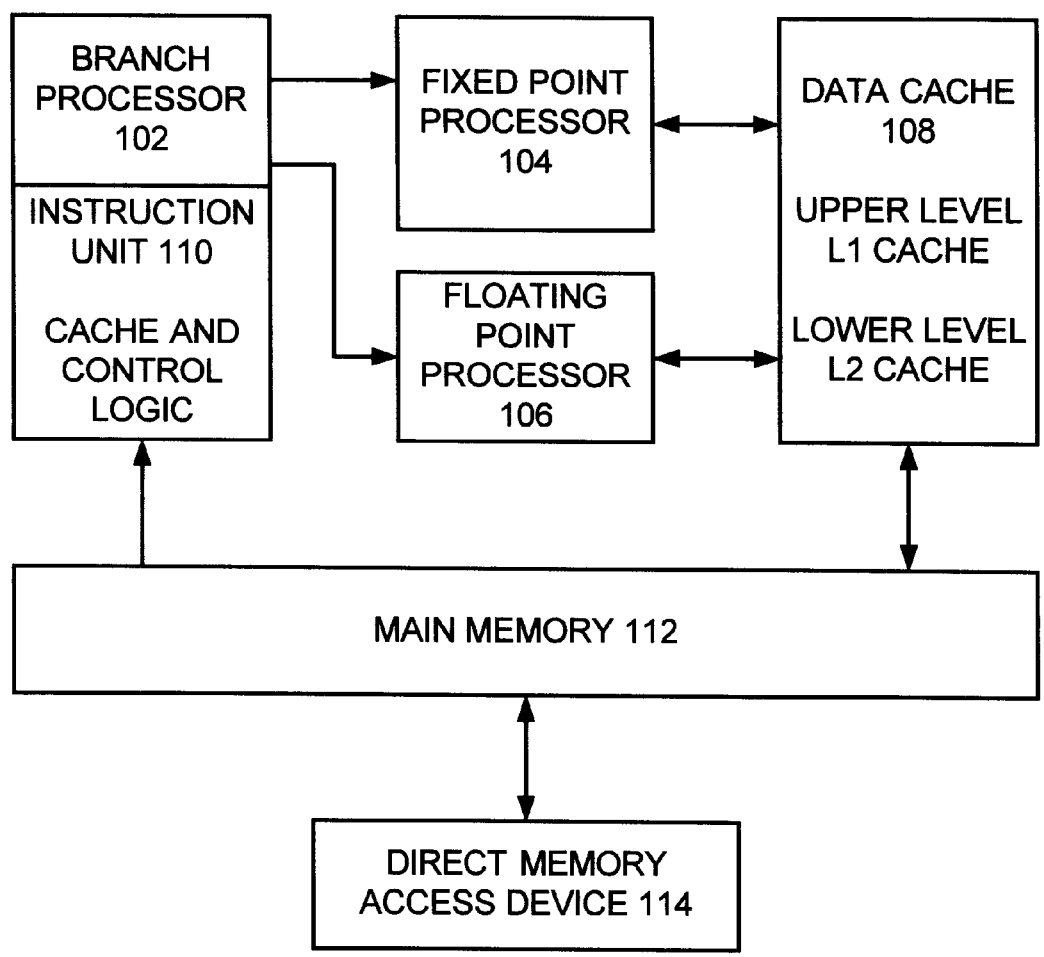
FIG. 1 is a block diagram representation of a computer system embodying the present invention.
Figure 2:
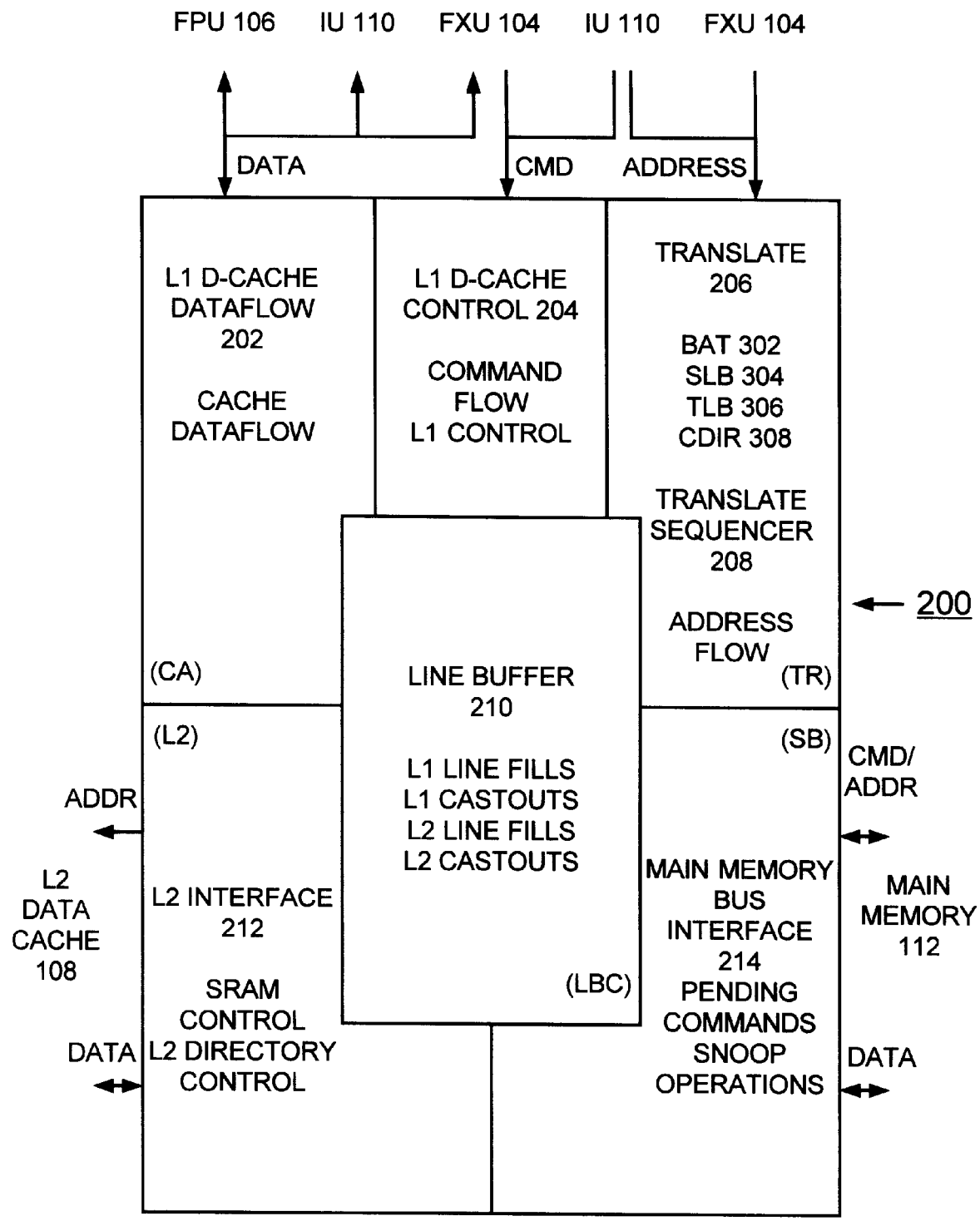
FIG. 2 is a block diagram representation of a storage control unit (SCU) of the computer system of FIG. 1 in accordance with the preferred embodiment.

Having reference now to the drawings, in FIGS. 1 and 2, there is shown a computer system in which a preferred embodiment may be implemented generally designated by the reference character 100 including a storage control unit generally designated by the reference character 200 in FIG. 2. As shown in FIG. 1, the computer system 100 includes a branch processor 102, a fixed point processor 104, and a floating point processor 106. Computer system 100 includes a data cache 108 and an instruction unit 110 coupled between the processors 102, 104, and 106 and a main memory 112. The data cache 108 includes an upper level L1 cache and a lower level L2 cache. The instruction unit 110 includes an instruction cache together with control logic. Computer system 100 includes a direct memory access device 114 coupled to the main memory 112. Computer system 100 has multithreaded execution capability.

Referring to FIG. 2, storage control unit (SCU) 200 includes an L1 D-CACHE dataflow partition 202 for controlling cache dataflow with the fixed point processor 104, the floating point processor 106, and the instruction cache 110. Storage control unit (SCU) 200 includes an L1 D-CACHE control partition 204 for controlling command flow and L1 control with the fixed point processor 104 and the instruction unit 110. Storage control unit (SCU) 200 includes a translation control partition 206 for controlling address flow with the fixed point processor 104 and the instruction unit 110. The translation control partition 206 includes a block address translation (BAT) 302, a segment lookaside buffer (SLB) 304, a translation lookaside buffer (TLB) 306, a cache directory (CDIR) 308 and a translate sequencer 208. Storage control unit (SCU) 200 includes a line buffer partition 210 queuing L1 line fills, L1 castouts, L2 line fills, and L2 castouts and providing an interface to the main memory 112. Storage control unit (SCU) 200 includes an L2 interface 212 for SRAM control and L2 directory control of address and data with the L2 data cache 108. A main memory bus interface 214 for controlling pending commands and snoop operations and communicating command/address and data with a bus connected to the main memory 112.

In accordance with features of the invention, to optimize system performance in the multithreading execution in computer system 100, the translation miss processing of data in the local cache 108 is given priority over thread switching. To optimize the storage control pipeline, a translation command next signal (TranslationCmdNext) is generated and applied by the translation control partition 206 to the cache control partition 204 when a translation command is coming. A very high level design language (VHDL) implementation of the preferred embodiment uses the TranslationCmdNext to allow the cache control partition 204 to get the storage control pipeline ready for the oncoming translation command and address. The VHDL implementation of the preferred embodiment allows a subsequent stage 1 of a Fetch PTE/STE (Page Table Entry/Segment Table Entry) translation command to occur in the same cycle as a preceding stage 3 of a Fetch PTE/STE translation command. The VHDL implementation of the preferred embodiment raises a steal signal to stall the processor pipeline after a valid translation miss to allow the Fetch PTE/STE or Byte Store translation command to have priority over a thread switch condition.

Figure 3:
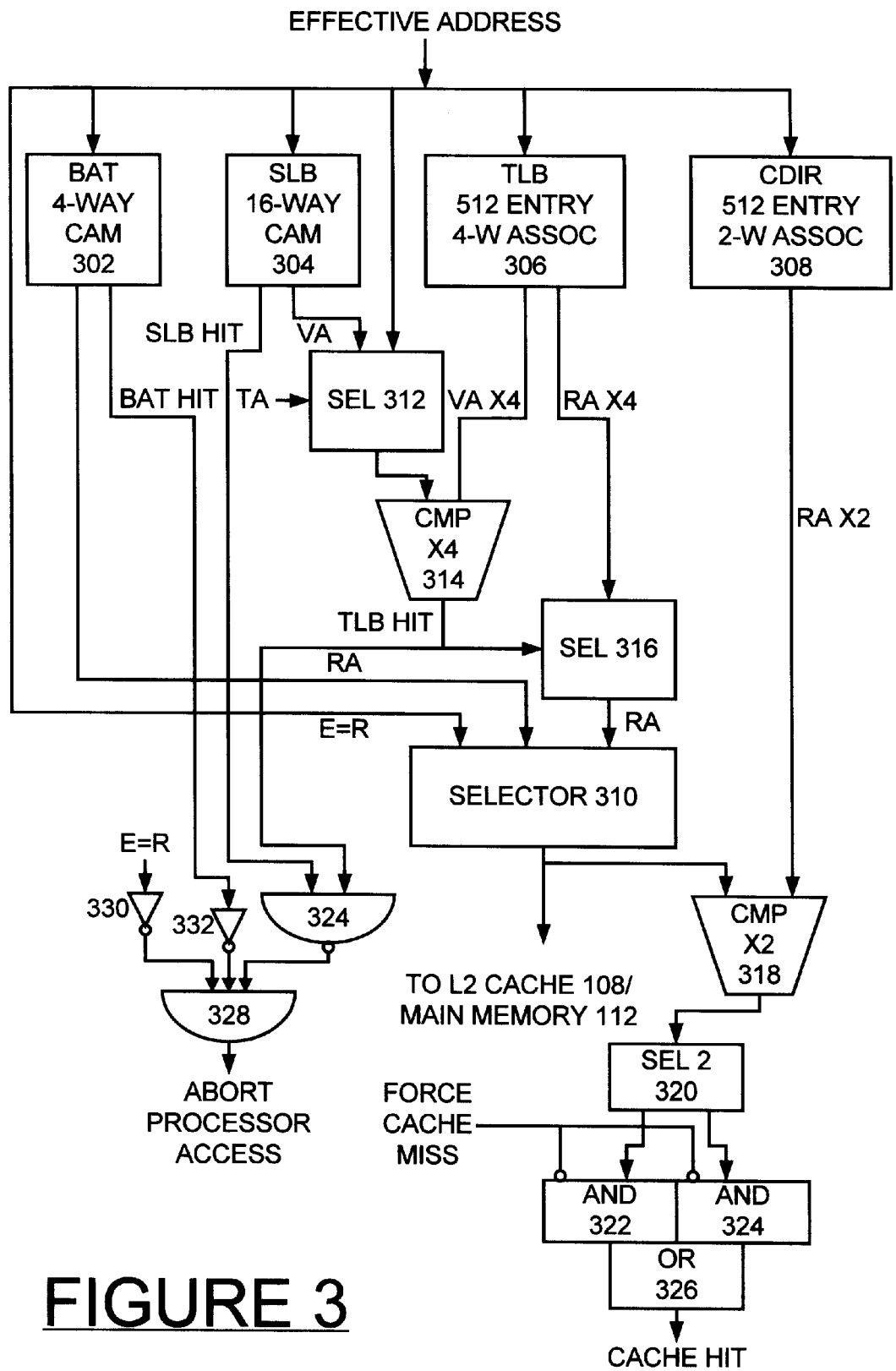
FIG. 3 is a schematic and block diagram representation of effective address translation logic in the computer system of FIG. 1 in accordance with the preferred embodiment.

Referring to FIG. 3, an effective address indicated at a line EFFECTIVE ADDRESS simultaneously is applied to the block address translation (BAT) 302, segment lookaside buffer (SLB) 304, translation lookaside buffer (TLB) 306, cache directory (CDIR) 308 of the translation control partition 206. An effective address corresponding to a real address indicated at a line E=R is applied to a selector 310 and is used to access storage L2 cache 108 or main memory 112.

An effective address that translates successfully via the Block Address Translation 302 is converted directly into a real address indicated at output line RA of the BAT 302 and applied to the selector 310 and is then used to access storage L2 cache 108 or main memory 112. For accesses that are mapped by a segmented address translation, a virtual address provided at the output of the content addressable memory SLB 304 is applied to a selector 312 indicated at a line VA. The effective address is applied to the selector 312 with a tag active control input applied to the selector 312 indicated at a line TA.

For example as shown in FIG. 3, the TLB 306, is a 4-way associative cache including 128 memory locations, each having four address entries for a total of 512 entries. At the output of TLB 306 at a line VA X4, four virtual addresses are provided to a compare by four (CMP X4) 314 for comparison four at a time with the virtual address output of selector 312. A match output of the CMP X4 314 indicated at a TLB HIT is applied to a selector 316 receiving a real address provided by the TLB 306 indicated at a line RA X4. Selector 316 applies the matching real address indicated at a line RA at the output of the selector 316 to the selector 310 and is then used to access storage L2 cache 108 or main memory 112.

A 512 entry 2-way associative cache can implement the cache directory (CDIR) 308, as shown in FIG. 3. At the output of CDIR 308 at a line RA X2, two real addresses are provided to a compare by two (CMP X2) 318 for comparison two at a time with the real address output of selector 310 and applied to a selector (SEL 2) 320. The outputs of SEL 2 320 are ANDED with an inverted FORCE CACHE MISS signal by a pair of AND gates 322 and 324. The outputs of AND gates 322 and 324 are applied to an OR gate 326 to provide a CACHE HIT signal.

An abort processor access logic includes a pair of inverters 330, 332 respectively receiving the E=R and BAT HIT signals. The SLB HIT and TLB HIT signals are applied to a NAND gate 324. The outputs of inverters 330, 332 and NAND gate 324 are ANDED by an AND gate 328 to provide an abort processor access signal if not a BAT HIT, TLB HIT, or SLB HIT, or not an E=R address access.

Referring to FIGS. 4A and 4B, there are shown addressing tables respectively illustrating tags active mode addressing and tags inactive mode addressing. An exemplary address translation for the computer system 100 is the translation of a 64-bit effective address (EA) to an 80-bit virtual address (VA) to a 40-bit real address (RA). It should be understood that the present invention is not limited to the exemplary address lengths described in this example and any bit length for any of the addresses is possible. For the purposes of this discussion all addresses will be assumed to be 80 bits in length numbered from 0 to 79. The addresses of less than the 80 bits are right justified with the most significant bits (MSBs) filled in with zeros. For example, the 40 MSBs of the 80-bit RA will be zero and the RA occupies bit positions 40–79.

Address translation can be accomplished in two ways. In the tags active mode addressing illustrated in FIG. 4A, the SLB 304 is not used, where the VA is equal to the EA with the MSBs set to zero. In the tags inactive mode addressing illustrated in FIG. 4B, the segment lookaside buffer (SLB) 304 is used. The SLB 304 does the translation from EA to VA. With a BAT HIT, the BAT 302 does the translation from EA to RA. With no BAT HIT, the translation lookaside buffer (TLB) 306 does the translation from VA to RA in both the tags active mode addressing of FIG. 4A and tags inactive mode addressing 4B. When the effective address is an E=R address (real address), or the effective address is an E=DS address (direct store address), or relocate is off, then the real address is set to the effective address.

In accordance with features of the invention, an efficient and effective method is provided for checking the parity across the 61-bit virtual address VA field. A very high level design language (VHDL) implementation of the invention uses the parity of a field in one array to verify that the parity of a similar field in another array is correct. The parity of the 61-bit VA is generated as it is loaded into the translation lookaside buffer (TLB) 306 and then when the data is read from the TLB 306, the generated parity is compared against the parity of the VA that had been previously loaded into the segment lookaside buffer (SLB) 304. Also the VHDL implementation of the invention eliminates any entries with parity errors out of the TLB 306 as a new entry needs the location.

Any one SLB entry 500 includes the 52 MSBs of the VA(0–51) 502. If the 36 bits of the EA in the SLB match the corresponding 36 bits of the EA being translated then a matching EA VA pair has been found. The 52 MSBs 502 of the VA contained in the SLB are then sent to the TLB 306. Any one TLB entry 506 contains the 61 MSBs of the VA(0–60) 508 and bits 40–67 of the RA (not shown in FIG. 5). There are 9 fewer bits in the VA(0–51) 502 that is contained in the SLB 304 than is contained in the TLB VA 508. These 9-bits are taken from the EA since the EA is equal to the VA for these bits. If the 61 MSBs of the VA(0–60) 508 in the TLB 306 match the 52-bits of the VA(0–51) 502 from the SLB concatenated with the 9-bits taken from the EA then a match has been found and the address used to address memory in the system is the 28 bits of the RA from the TLB concatenated with the 12 Least Significant Bits (LSBs) of the EA from the processor.

The translation that does not use the SLB 304 is now described. In this case the 80-bit VA is equal to the EA. If the 61 MSBs of the VA match the 61 bits of the VA in the TLB then a match has been found and the address used to address memory in the system is the 28 bits of the RA from the TLB concatenated with the 12 LSBs of the EA.

The SLB 304 in this system is not subject to parity errors so no parity generation or checking is required. The TLB 306 is subject to parity errors. Therefore all fields in the TLB 306 required parity error checking. The errors that can exist in the TLB 306 are soft errors, meaning that if new data was written into a field containing an error it would not also have the same error and would not be prone to having the same error occur. All fields in the TLB 306 except for the VA use a typical parity generation and checking scheme where the parity is calculated as the array is written and checked as the array is read. All of the TLB fields except the VA are small enough that they can be broken into small enough fields so that the system cycle time can be achieved. The VA field of 61 bits could not be broken down into small enough fields and still fit the required array size and then achieve the required cycle time.

Figure 5:
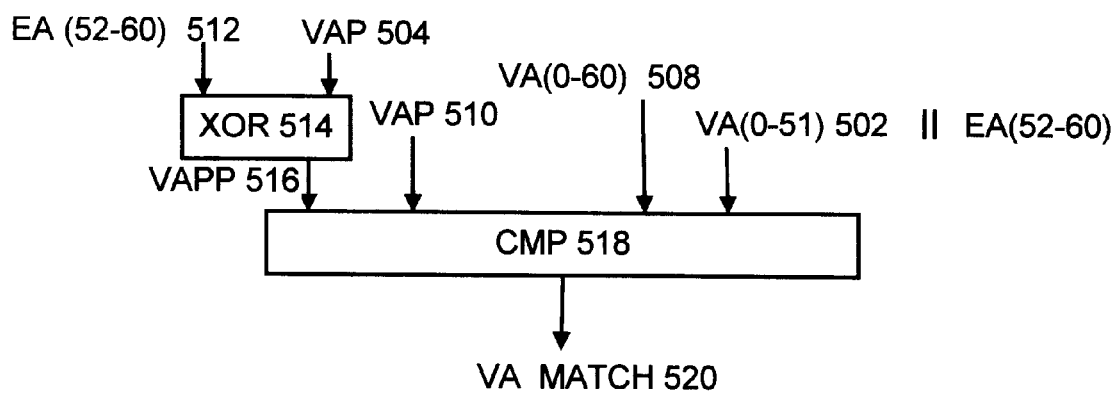
FIG. 5 is a schematic and logical flow diagram illustrating error detection in accordance with the preferred embodiment.

Having reference to FIG. 5, there is shown a schematic and logical flow diagram illustrating error detection in accordance with the preferred embodiment. An improved error checking method of the invention is provided for detecting virtual address parity error for the translation lookaside buffer 306. The method used for error checking for the 61 bit VA field in the TLB is implemented as follows:

Parity is generated for the VA (0–51) 502 field of each SLB entry 500 as the entry is about to be written and then is stored as a virtual address parity VAP 504 with the entry 500 when it is written. Parity is generated for the VA (0–60) field 508 of each TLB entry 506 as the entry is about to be written and then stored as a virtual address parity VAP 510 with the entry 506 when it is written. These parity bits 504 and 510 are used for parity error detection when the entries are read out.

Error detection for the translation case that uses the SLB 304 is now described. During translation both the SLB 304 and the TLB 306 are read. The SLB entry 500 contains only the 52 MSBs of the VA(0–51) 502. The remaining 9-bits that go along with the SLB VA are taken from the EA (52–60) and used with the SLB VA parity bit VAP 502 to generate parity over the 61 bits of the VA. The VAP 502 and the EA (52–60) are applied to an XOR gate 514 to generate a parity predict bit VAPP 516. This parity bit VAPP 516 along with the TLB VA Parity bit VAP 510 are compared by a compare 518. The VAs VA(0–51) 502 and VA(0–60) 508 from both the SLB 304 and the TLB 306 are compared by the compare 518 to check for a VA match at the output of compare 518 labeled VA MATCH 520. If either the 2 parity bits VAPP 516 and VAP 510 or the 2 VAs VA(0–51) 502 and VA(0–60) 508 do not match then there is no VA match.

Error detection for the translation case that does not use the SLB 304 is done the same way except that the VA parity from the SLB is actually the parity generated totally from the EA (0–60) to generate VAPP 516. This parity bit VAPP 516 and the TLB VA Parity bit VAP 510 and the VAs are then compared to check for a VA match, as described above. Again, if either the 2 parity bits or the 2 VAs do not match then there is no VA match.

A mismatch can occur if either a bit in the VA(0–60) 508 from the TLB 306 has been flipped or if the parity bit VAP 510 from the TLB has been flipped. The parity bit being flipped will be detected in the parity compare 518 and results in a VA mismatch. A bit flipped in the VA portion will cause a mismatch in the VA fields between the VA(0–60) 508 from the TLB 306 and the VA from the SLB 304 (or from the EA). The VA from the TLB 306 that has a random bit flipped will never match with a VA from the SLB (or EA) since if the VA with that particular bit inverted did exist its parity bit would also be the opposite polarity and the parity bits would mismatch and there would be no VA match.

Once an entry has a bit flipped it will never match with any VA. This means that this entry eventually becomes the Least Recently Used (LRU) entry. Once this is the case and a new entry needs to be written into the TLB the entry with the error in it will be overwritten and will no longer exist.

This example could logically be extended to any length of addresses for any addressing scheme.

Figure 6:
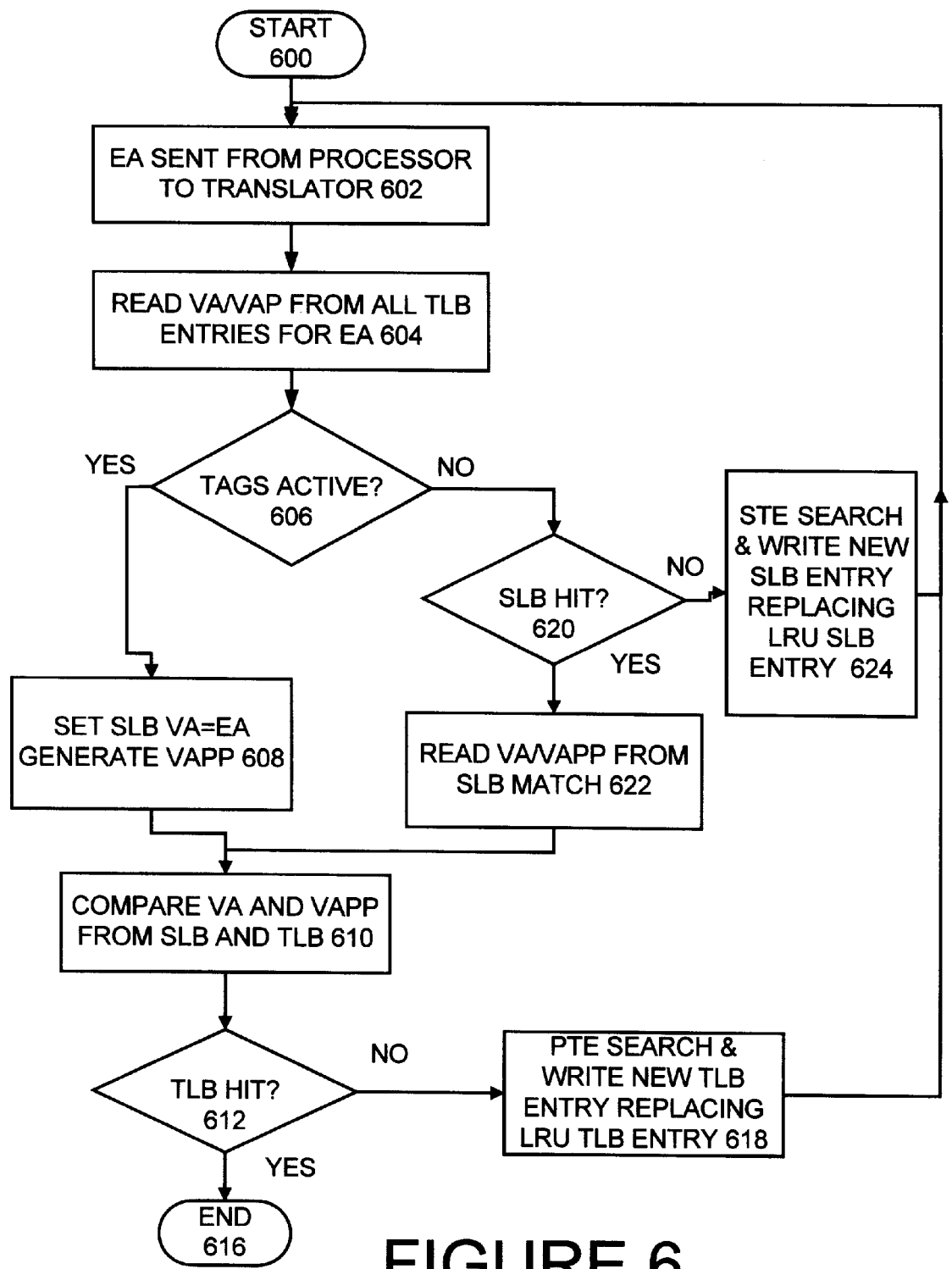
FIG. 6 is a flow chart illustrating sequential steps for address translation including parity error detection in the computer system of FIG. 1 in accordance with the preferred embodiment.

Referring to FIG. 6, there is shown a flow chart illustrating sequential steps starting at a block 600 for address translation including parity error detection in accordance with the preferred embodiment in the computer system 100. A effective address EA from the processor 110 or 104 is sent to the translation control partition 206 of the SCU 200 as indicated at a block 602. The VA(0–60) 508 and VAP 510 from all TLB entries 506 are read for the EA as indicated at a block 604. Checking whether tags are active is performed as indicated at a decision block 606. If the system is in tags active addressing mode, then the VA in the SLB 304 is set to the EA and VAPP 516 is generated as indicated at a block 608. Then the VA in the SLB 304 and the VAPP 516 are compared with the VA 508 and VAP 510 in the TLB 306 as indicated at a block 610. Checking for a TLB HIT is performed as indicated at a decision block 612. If a TLB HIT is identified at block 612, this ends the sequential operations as indicated at a block 616. If a TLB HIT is not identified at block 612, then the page table entries (PTE) are searched and a new TLB entry 506 is written in a Least Recently Used (LRU) TLB entry 506 as indicated at a block 618. Then the sequential operations return to block 602 continuing with a new EA or the same EA back again from the processor.

If the system is in tags inactive addressing mode at block 606, then checking for a SLB HIT is performed as indicated at a decision block 620. If a SLB HIT is identified at block 620, then the VA 502 and VAP 504 from the SLB match are read and VAPP 516 is generated as indicated at a block 622. Then the VA in the SLB 304 and the VAPP 516 are compared with the VA 508 and VAP 510 in the TLB 306 at block 610 and the operations are continued as described above. If a SLB HIT is not identified at block 620, then the segment table entries (STE) are searched and a new SLB entry 500 is written replacing the LRU SLB entry as indicated at a block 624. Then the sequential operations return to block 602 continuing with a new EA or the same EA back again from the processor.

While the present invention has been described with reference to the details of the embodiments of the invention shown in the drawing, these details are not intended to limit the scope of the invention as claimed in the appended claims.

What is claimed is:

1. Apparatus for detecting virtual address parity error for a translation lookaside buffer in a computer system, said apparatus comprising:

means for generating a virtual address parity (VAP) for each entry written in a segment lookaside buffer (SLB);

means for generating a virtual address parity (VAP) for each virtual address entry written in the translation lookaside buffer (TLB);

means utilizing said SLB virtual address parity (VAP) and said TLB virtual address parity (VAP) for identifying a translation miss condition; and means utilizing said SLB virtual address parity (VAP) and predetermined effective address bits for generating a virtual address parity predict (VAPP).

2. Apparatus for detecting virtual address parity error for a translation lookaside buffer in a computer system as recited in claim 1 wherein said means utilizing said SLB virtual address parity (VAP) and said TLB virtual address parity (VAP) for identifying said translation miss condition include means for comparing said virtual address parity predict (VAPP) and said TLB virtual address parity (VAP).

3. Apparatus for detecting virtual address parity error for a translation lookaside buffer in a computer system as recited in claim 3 wherein said means utilizing said SLB virtual address parity (VAP) and said TLB virtual address parity (VAP) for identifying said translation miss condition further include means for comparing virtual address entries from said TLB and said SLB.

4. Apparatus for detecting virtual address parity error for a translation lookaside buffer in a computer system as recited in claim 1 wherein said means for generating said virtual address parity (VAP) for each entry written in a segment lookaside buffer (SLB) includes means for writing a virtual address in each said entry written in a segment lookaside buffer (SLB) and means, responsive to said written virtual address, for generating said virtual address parity (VAP) and storing said virtual address parity (VAP) in each said entry written in a segment lookaside buffer (SLB).

5. Apparatus for detecting virtual address parity error for a translation lookaside buffer in a computer system as recited in claim 4 further includes means for generating a virtual address parity predict (VAPP) for a complete virtual address including said written virtual address in each said entry in a segment lookaside buffer (SLB) together with predetermined effective address EA bits.

6. Apparatus for detecting virtual address parity error for a translation lookaside buffer in a computer system as recited in claim 5 wherein said means for generating said virtual address parity (VAP) for each virtual address entry written in the translation lookaside buffer (TLB) includes means for writing said complete virtual address including said written virtual address in each said entry in a segment lookaside buffer (SLB) and said predetermined effective address EA bits in each said entry written in said translation lookaside buffer (TLB) and means, responsive to said written virtual address, for generating said virtual address parity (VAP) and storing said virtual address parity (VAP) in each said entry written in a translation lookaside buffer (TLB).

7. A computer implemented method for detecting virtual address parity error for a translation lookaside buffer in a computer system, said method comprising the steps of:

generating a virtual address parity (VAP) for each entry written in a segment lookaside buffer (SLB);

generating a virtual address parity (VAP) for each virtual address entry written in the translation lookaside buffer (TLB);

utilizing said SLB virtual address parity (VAP) and said TLB virtual address parity (VAP) for identifying a translation miss condition;

generating a virtual address parity predict (VAPP) utilizing said SLB virtual address parity (VAP) and predetermined effective address bits;

comparing said VAPP and said TLB virtual address parity (VAP); and detecting said translation miss condition responsive to said VAPP and said TLB virtual address parity (VAP) not matching.

8. A computer implemented method for detecting virtual address parity error for a translation lookaside buffer as recited in claim 7 includes the steps responsive to identifying said translation miss condition for performing a search of page table entries; identifying a least recently used (LRU) TLB entry and writing a new TLB entry replacing said LRU TLB entry.

9. A computer implemented method for detecting virtual address parity error for a translation lookaside buffer as recited in claim 7 wherein said step of utilizing said SLB virtual address parity (VAP) and said TLB virtual address parity (VAP) for identifying said translation miss condition includes the steps of comparing virtual address entries from said TLB and said SLB;

detecting said translation miss condition responsive to said compared virtual address entries not matching.

10. A computer system comprising:

a processor unit, a cache coupled to said processor unit, a main memory, a storage control unit including a translation lookaside buffer (TLB) and a segment lookaside buffer (SLB);

means for generating a virtual address parity (VAP) for each entry written in a segment lookaside buffer (SLB);

means for generating a virtual address parity (VAP) for each virtual address entry written in the translation lookaside buffer (TLB);

means utilizing said SLB virtual address parity (VAP) and said TLB virtual address parity (VAP) for identifying a translation miss condition; and means utilizing said SLB virtual address parity (VAP) and predetermined effective address bits for generating a virtual address parity predict (VAPP).

11. A computer system as recited in claim 10, includes means for comparing said virtual address parity predict (VAPP) and said TLB virtual address parity (VAP) for identifying said translation miss condition.

12. A computer system as recited in claim 11, includes means for comparing virtual address entries in said TLB and said SLB for identifying said translation miss condition.

* * * * *